(12) United States Patent
Bailey

(10) Patent No.: US 12,012,761 B2
(45) Date of Patent: Jun. 18, 2024

(54) GUTTER HANGER

(71) Applicant: GPI Home Solutions, Elkhorn, NE (US)

(72) Inventor: Lance Bailey, Elkhorn, NE (US)

(73) Assignee: GPI Home Solutions, Elkhorn, NE (US)

( * ) Notice: Subject to any disclaimer, the term of this patent is extended or adjusted under 35 U.S.C. 154(b) by 0 days.

(21) Appl. No.: 17/517,649

(22) Filed: Nov. 2, 2021

(65) Prior Publication Data

US 2022/0136252 A1 May 5, 2022

Related U.S. Application Data

(60) Provisional application No. 63/108,814, filed on Nov. 2, 2020.

(51) Int. Cl.
| | | |
|---|---|---|
| *E04D 13/072* | (2006.01) | |
| *E04D 13/068* | (2006.01) | |
| *F16M 13/02* | (2006.01) | |

(52) U.S. Cl.
CPC ....... *E04D 13/0725* (2013.01); *E04D 13/068* (2013.01); *E04D 13/072* (2013.01); *E04D 13/0722* (2013.01); *E04D 13/0727* (2013.01); *F16M 13/02* (2013.01)

(58) Field of Classification Search
CPC .............. E04D 13/0725; E04D 13/072; E04D 13/0727; E04D 13/068; E04D 13/0685; E04D 13/0722; F16M 13/027; F16M 13/02; F16M 13/022; E04B 9/006; A47G 1/1626; A47G 1/202; A47H 1/142; A47H 1/122; A47H 1/144; A47H 1/124; F16B 45/00; F16B 37/045; A47B 96/061; F16L 3/243
USPC ....................................................... 248/48.2
See application file for complete search history.

(56) References Cited

U.S. PATENT DOCUMENTS

| | | | | |
|---|---|---|---|---|
| 148,952 | A * | 3/1874 | Hess et al. .......... | E04D 13/0725 248/48.1 |
| 456,877 | A * | 7/1891 | Bingman ............ | E04D 13/0725 144/287 |
| 472,294 | A * | 4/1892 | Heartly ............... | E04D 13/0725 248/48.1 |
| 476,892 | A * | 6/1892 | Morris .................. | A47H 1/122 248/265 |
| 535,007 | A * | 3/1895 | Herrin ................ | E04D 13/0725 248/48.2 |
| 635,317 | A * | 10/1899 | Hartley ............... | E04D 13/0722 248/48.1 |
| 635,359 | A * | 10/1899 | Taft ..................... | E04D 13/0725 248/48.2 |
| 696,303 | A * | 3/1902 | Baur ...................... | A47H 1/122 248/265 |

(Continued)

FOREIGN PATENT DOCUMENTS

| | | | | |
|---|---|---|---|---|
| CA | 2390777 | C * | 5/2008 | ........ E04D 13/0725 |
| CA | 2688909 | A1 * | 5/2011 | ........ E04D 13/0725 |

(Continued)

*Primary Examiner* — Taylor Morris
(74) *Attorney, Agent, or Firm* — Dax D. Anderson; Kirton McConkie

(57) ABSTRACT

A gutter hanger with radiused deep vertical side walls to improve the hanger strength with a surface suitable for attaching accessories such as Christmas lights or heat tape.

14 Claims, 4 Drawing Sheets

(56) References Cited

U.S. PATENT DOCUMENTS

| | | | | | |
|---|---|---|---|---|---|
| 707,941 | A | * | 8/1902 | Pope | E04D 13/0722 248/48.1 |
| 1,054,723 | A | * | 3/1913 | Todd | E04D 13/0722 248/48.1 |
| 1,397,329 | A | * | 11/1921 | Rachlin | E04D 13/0722 248/48.1 |
| 1,558,385 | A | * | 10/1925 | Meunier | E04D 13/0725 248/48.1 |
| 1,566,284 | A | * | 12/1925 | Rachlin | E04D 13/0722 248/48.1 |
| 1,571,277 | A | * | 2/1926 | Knab | E04D 13/0722 248/245 |
| 1,706,458 | A | * | 3/1929 | Mullen | E04D 13/0722 248/48.1 |
| 1,755,453 | A | * | 4/1930 | Mullen | E04D 13/0722 248/48.1 |
| 1,997,663 | A | * | 4/1935 | Usinger | E04D 13/0725 248/48.1 |
| 2,065,091 | A | * | 12/1936 | Petersen | E04D 13/0725 248/48.1 |
| 2,137,781 | A | * | 11/1938 | Payne | E04D 13/072 248/48.1 |
| 2,185,385 | A | * | 1/1940 | Rose | A47H 1/122 248/265 |
| 2,550,780 | A | * | 5/1951 | Cohn | E04D 13/0725 248/48.1 |
| 2,569,622 | A | * | 10/1951 | Trainor | A47G 1/1613 248/297.21 |
| 2,688,457 | A | * | 9/1954 | Hammarstrom | E04D 13/0725 248/48.1 |
| 2,964,280 | A | * | 12/1960 | Rinaldi | A47H 1/122 248/265 |
| 3,126,181 | A | * | 3/1964 | Steeg | E04D 13/0725 248/48.2 |
| 3,547,385 | A | * | 12/1970 | Kindorf | F16L 3/243 29/897 |
| 3,565,385 | A | * | 2/1971 | Zurawski | F16L 3/223 248/68.1 |
| 3,630,473 | A | * | 12/1971 | Landis | E04D 13/076 248/222.51 |
| 3,737,127 | A | * | 6/1973 | Maloney, Jr. | E04D 13/0725 403/349 |
| 4,120,474 | A | * | 10/1978 | Hurley | A47H 1/124 248/265 |
| 4,210,301 | A | * | 7/1980 | Weiss | E04D 13/0725 52/16 |
| 4,375,805 | A | * | 3/1983 | Weber | E04D 13/0762 126/714 |
| 4,897,958 | A | * | 2/1990 | Brydges | A47H 27/00 47/68 |
| 4,961,553 | A | * | 10/1990 | Todd | F16L 3/243 248/62 |
| 5,165,628 | A | * | 11/1992 | Todd | F16B 37/045 248/62 |
| 5,737,879 | A | * | 4/1998 | Sweet | E04D 13/076 52/12 |
| 5,884,876 | A | * | 3/1999 | Axford | E04D 13/0722 248/48.1 |
| 6,168,125 | B1 | * | 1/2001 | Winger | A47H 1/144 248/48.1 |
| 6,254,039 | B1 | * | 7/2001 | Zimmerman | E04D 13/0725 248/48.1 |
| 6,543,729 | B1 | * | 4/2003 | Ylonen | E04D 13/0725 52/715 |
| 6,631,587 | B2 | * | 10/2003 | Lynch | E04D 13/0725 52/12 |
| 6,658,796 | B1 | * | 12/2003 | Higgins | E04D 13/0725 248/48.2 |
| 7,523,894 | B1 | * | 4/2009 | Eddy | E04D 13/0725 52/16 |
| 7,624,541 | B2 | * | 12/2009 | Gentry | E04D 13/076 52/12 |
| 8,672,286 | B2 | * | 3/2014 | Darre | A47G 1/164 33/666 |
| 9,696,021 | B2 | * | 7/2017 | Wronski | F21V 21/048 |
| 9,929,549 | B2 | * | 3/2018 | Witherbee | F16M 13/022 |
| 10,233,647 | B2 | * | 3/2019 | Elliott | F16B 2/22 |
| 10,267,043 | B2 | * | 4/2019 | Conner | E04D 13/0725 |
| 11,180,920 | B1 | * | 11/2021 | Pratt | E04D 13/0725 |
| 2013/0284867 | A1 | * | 10/2013 | Walters | E04D 13/0725 248/205.1 |
| 2014/0196400 | A1 | * | 7/2014 | Bell | E04D 13/0725 52/705 |
| 2015/0284961 | A1 | * | 10/2015 | Iannelli | E04D 13/0725 248/48.2 |
| 2015/0316177 | A1 | * | 11/2015 | Knutson | F16B 7/04 248/59 |
| 2016/0003375 | A1 | * | 1/2016 | Robertson, Jr. | E21F 17/02 248/341 |
| 2016/0168857 | A1 | * | 6/2016 | Neumann | E04D 13/064 52/16 |
| 2019/0277034 | A1 | * | 9/2019 | Stacye | E04D 13/0725 |

FOREIGN PATENT DOCUMENTS

| | | | | |
|---|---|---|---|---|
| CA | 2978241 | A1 * | 3/2018 | E04D 13/0725 |
| FR | 2571411 | A1 * | 4/1986 | E04D 13/0722 |
| GB | 1246621 | A * | 9/1971 | E04D 13/0725 |
| KR | 101742559 | B1 * | 6/2018 | E04D 13/0722 |

* cited by examiner

GUTTER HANGER

BACKGROUND OF THE INVENTION

Gutter hangers, used to hang rain gutters to a building roofline, come in several styles. The most common hanger style secures to the roof fascia board by securing a portion of the hanger to the fascia board and then cantilever an extension across the top of the gutter to the far lip. One end holds up the gutter from its outer lip, while the other has a hollow piece where a fastener, usually a spike or long screw, is driven into. The fastener spans about half the width of the gutter trough. This type of hanger can also be installed at the center of the gutter trough, concealing the hanger from the ground to show a cleaner look.

Another hanger style is the exposed strap and bracket which uses U-shaped metal brackets that support the gutter trough underneath instead of penetrating it. The gutter is supported by a load-bearing strap attached to the fascia board and cantilevers to support the bracket. However, these existing known gutter hangers often interfere with the flow water and debris along the bottom of the gutter. As a result troughs filled with debris attract more debris and allow water to pool, increasing the weight of the trough and further stressing the gutter hanger. Accordingly, a need exists for a strong hanger that allows flow of water and debris down the gutter and can support heavier gutters. A further need exists for a gutter hanger that can support the additional weight of a gutter cover. A further need exists for a gutter hanger that can support the additional weight of a gutter cover that may accumulate ice. A further need exists for a gutter hanger that cantilevers from the roof. A further need exists for a gutter hanger with an adjustable cantilevers that can selectively change the angle between the hanger and the roof to match the angle of the roof and/or the angle of a gutter cover.

SUMMARY OF THE INVENTION

A gutter hanger and gutter hanger system configured to support a gutter while draining water and dirt. One general aspect includes a strut comprising a center portion having a primary surface, a first end, a second end and a center cut in the center portion extending axially between the first end and the second end. Other embodiments of this aspect include corresponding gutters, roof straps and fasteners, each configured to perform the actions of the methods.

Implementations may include one or more of the following features. The gutter hanger where the center portion further may include a first side wall, a second side wall, a third side wall and a fourth side wall where each sidewall extends parallel axially along the center portion in a plane substantially orthogonal the primary surface of the gutter hanger. The center cut further may include a plurality of flanges extending orthogonally from a distal edge of the second sidewall and third sidewall towards the midline of the center cut. The flanges further may include a plurality of dimples. The flanges further may include a plurality of corresponding dimples configured to receive a roof strap. The center cut may include a drain. The center portion further may include a first radius strut formed on a first side of the center cut and a second radius strut formed on a second side of the center cut. The gutter hanger may include a radiused edge. The gutter hanger may include a first gusset and a second gusset formed between the center portion and the first end. The gutter hanger may include a first gusset and a second gusset formed between the center portion and the second end. Implementations of the described techniques may include gutters, roof straps and fasteners.

One general aspect includes a strut with a center portion, a first end, a second end and a center cut in the center portion between the first end and the second end where the center portion further may include a first radius strut formed on a first side of the center cut and a second radius strut formed on the second side of the center cut. Other embodiments of this aspect include gutters, roof straps or fasteners each configured to perform the actions of the methods.

One general aspect includes a gutter hanger comprising a strut forming a primary plane, the strut may include a center portion, a first end, a second end and a center cut in the center portion between the first end and the second end; a sidewall extending transverse the primary plane from edge of the strut forming the center cut, a flange extending from a terminal end of the sidewall and parallel the primary plane of the strut, and a plurality of corresponding dimples formed in the flange on opposite sides of the center cut. Other embodiments of this aspect include a gutter, a roof strap or fasteners each configured to perform the actions of the methods.

DETAILED DESCRIPTION OF THE INVENTION

Figure 1:
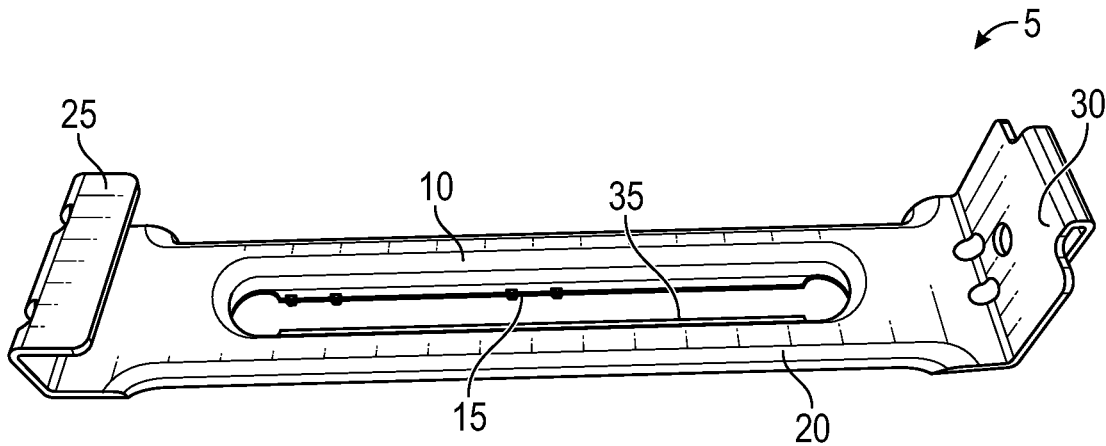
FIG. 1 shows a perspective view of the improved hanger.
Figure 2:
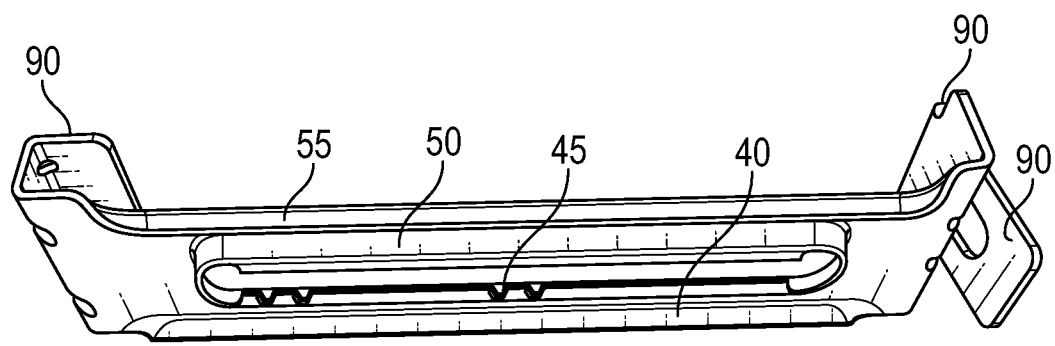
FIG. 2 shows a side view of the improved hanger.
Figure 3:
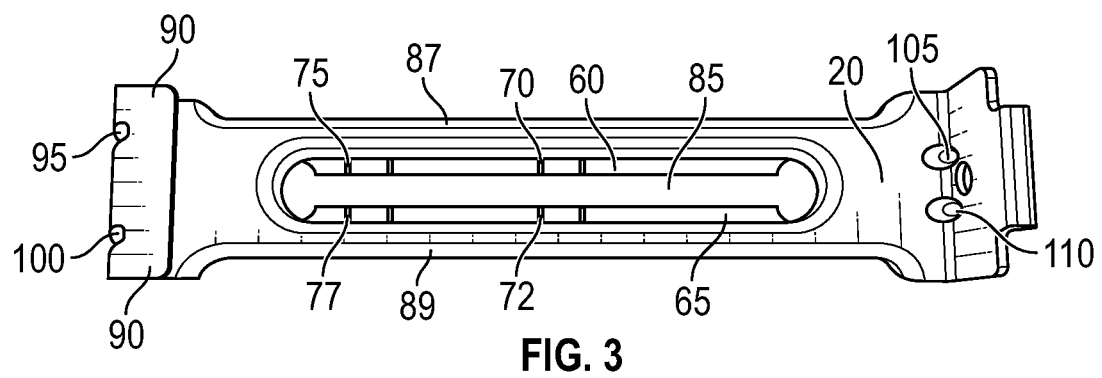
FIG. 3 shows a front view of the improved hanger.
Figure 4:
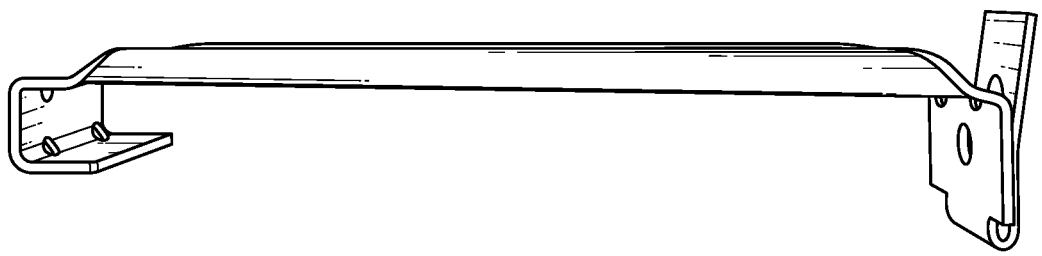
FIG. 4 shows an alternative side view of the improved hanger.
Figure 5:
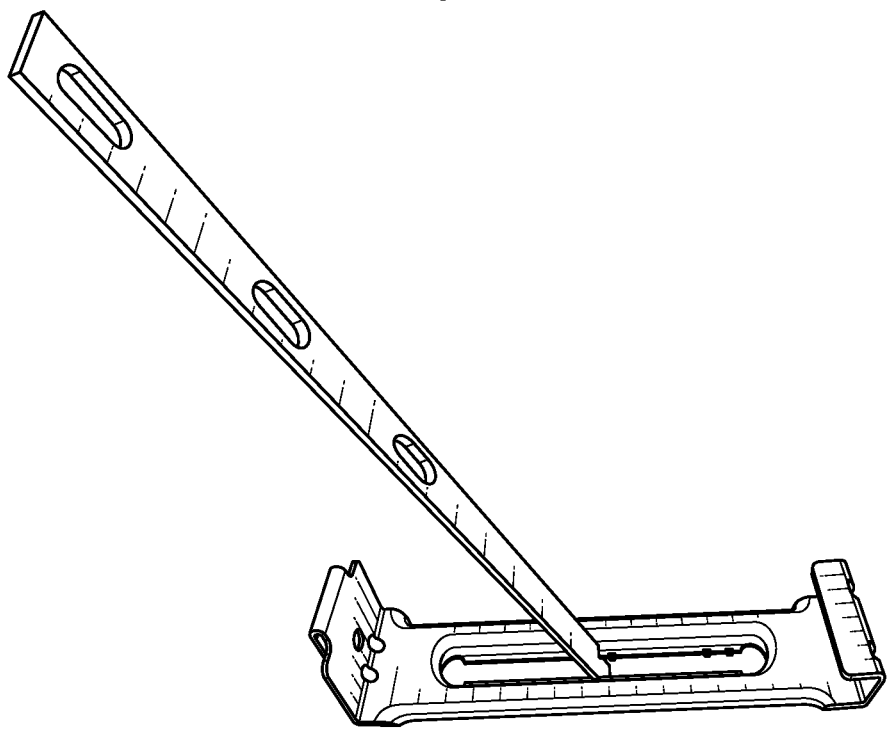
FIG. 5 shows an alternative front view of the improved hanger.
Figure 6:
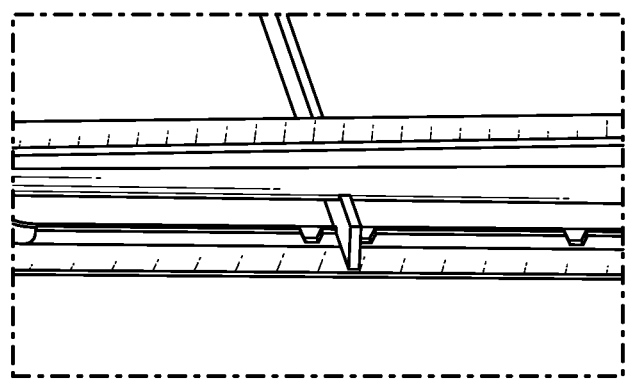
FIG. 6 shows an alternative side view of the improved hanger and extension.
Figure 7:
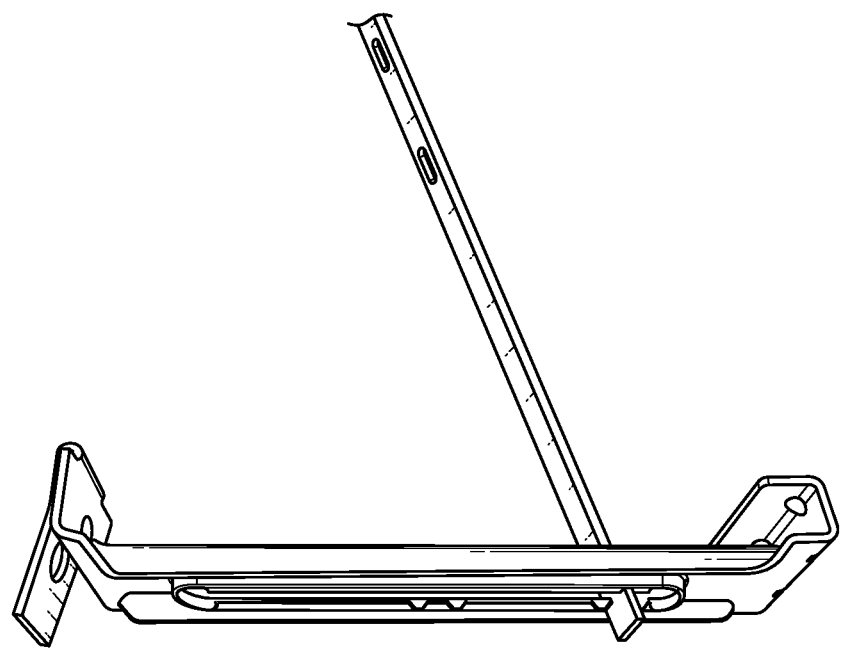
FIG. 7 shows an alternative side view of the improved hanger and extension.
Figure 8:
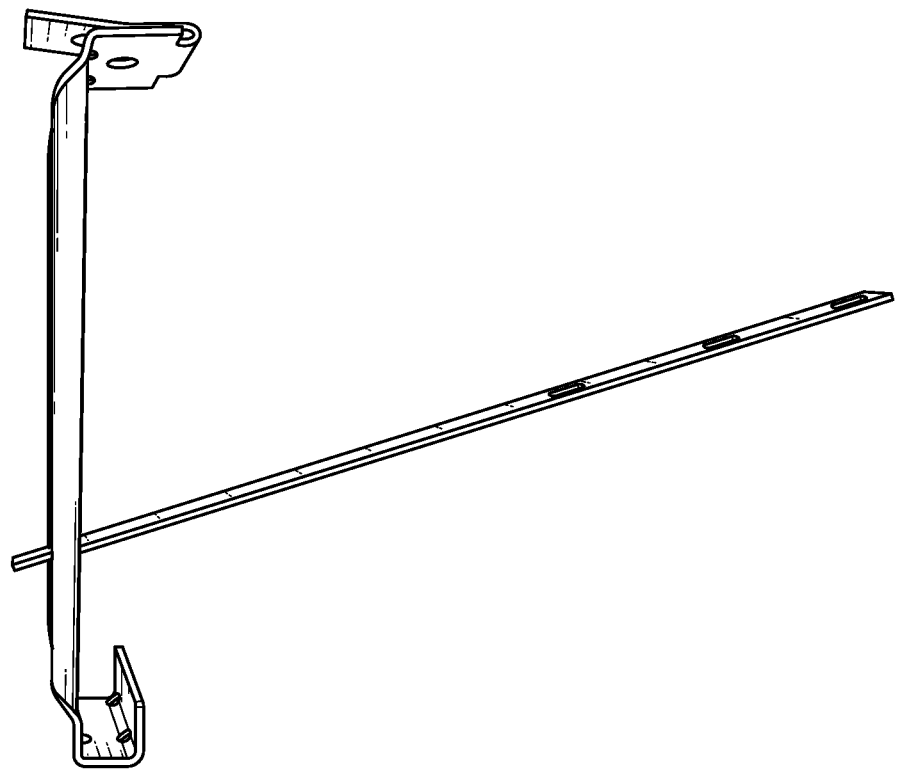
FIG. 8 shows an alternative side view of the improved hanger and extension.
Figure 9:
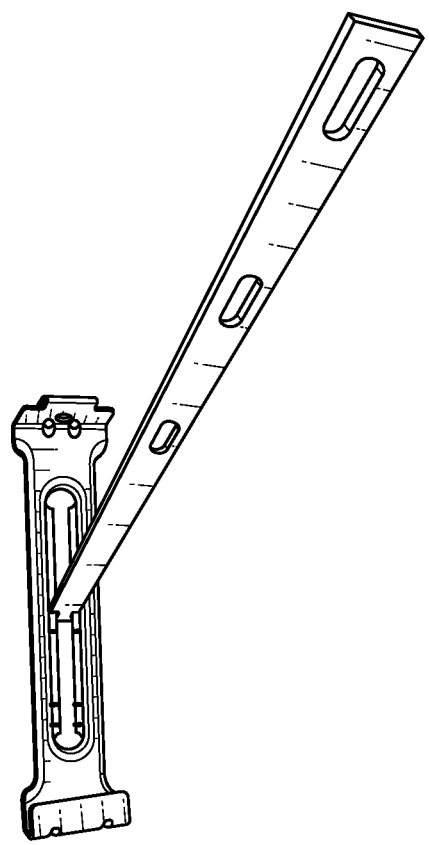
FIG. 9 shows an alternative perspective view of the improved hanger and extension.
Figure 10:
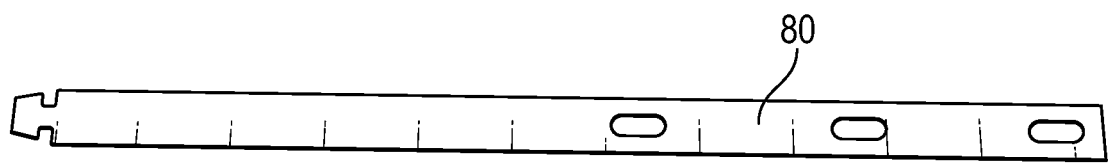
FIG. 10 shows a perspective view of the extension.

The present embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed descriptions of the embodiments of the apparatus, as represented in FIGS. 1 through 3 are not intended to limit the scope of the invention, as claimed, but are merely representative of present embodiments of the invention.

In general, the figures disclose an gutter hanger designed to drain water, support a load and allow a roof strap to selectively couple to the hanger.

In the following description, numerous references will be made to gutters, roof straps and fasteners, but these items are not shown in detail in the figures. However, it should be understood that one of ordinary skill in the art and in possession of this disclosure, would readily understand how the present invention can be incorporated into a gutter system.

Detailed references will now be made to embodiments of the gutter hanger described and claimed herein, examples of which are illustrated in FIGS. 1-10. Some embodiments comprise a gutter hanger 5 comprising a strut 10 comprising a center portion 15 having a primary surface 20, a first end 25, a second end 30 and a center cut 35 in the center portion 15 extending axially between the first end 25 and the second end 30. In some embodiments the center portion 15 further comprises a first side wall 40, a second sidewall 45, a third sidewall 50 and a fourth sidewall 55 wherein each sidewall extends parallel axially along the center portion in a plane substantially orthogonal the primary surface of the gutter hanger. In some embodiments the center cut further comprises a plurality of flanges 60, 65 extending orthogonally from a distal edge of the second sidewall 45 and third sidewall 50 towards the midline of the center cut. In some embodiments the flanges further comprise a plurality of dimples 70. In some embodiments the flanges further comprise a plurality of corresponding dimples 70, 75 configured to receive a roof strap 80. In some embodiments the center cut comprises a drain 85. In some embodiments the center portion further comprises a first radiused strut 87 formed on a first side of the center cut and a second radiused strut 89 formed on a second side of the center cut. In some embodiments the gutter hanger further comprises a radiused edge 90. The gutter hanger of claim 1 further comprising a first gusset 95 and a second gusset 100 formed between the center portion 15 and the first end 25. The gutter hanger of claim 1 further comprising a first gusset 105 and a second gusset 110 formed between the center portion 15 and the second end 30.

In some embodiments a gutter hanger comprises a strut comprising a center portion 15, a first end 25, a second end 30 and a center cut 35 in the center portion 15 between the first end 25 and the second end 30 wherein the center portion 15 further comprises a first radiused strut 87 formed on a first side of the center cut and a second radiused strut 88 formed on the second side of the center cut.

In some embodiments the center portion 15 further comprises a first sidewall 40, a second sidewall 45, a third sidewall 50 and a fourth sidewall 55 wherein each sidewall extends parallel axially along the center portion in a plane substantially orthogonal the surface of the gutter hanger 20. In some embodiments the center cut 35 further comprises a plurality of flanges 60, 65 extending orthogonally from a distal edge the second sidewall 45 and third sidewall 50 towards the midline of the center cut 35. In some embodiments the flanges further comprise a plurality of dimples 70, 75. In some embodiments the flanges further comprise a plurality of corresponding dimples 70, 72 configured to receive a roof strap 80. In some embodiments the center cut 35 comprises a drain 85.

In some embodiments a gutter hanger 5 comprises a strut 10 forming a primary plane 20. In some embodiments the strut 10 comprises a center portion 15, a first end 25, a second end 30 and a center cut 35 in the center portion 15 between the first end 25 and the second end 30. In some embodiments the sidewall 40, 45, 50, 55 extends transverse the primary plane 20 from the edge of the strut 10 forming the center cut 15. In some embodiments a flange 60, 65 extends from a terminal end of the sidewall 45, 50 and parallel the primary plane 20 of the strut 10. In some embodiments a plurality of corresponding dimples 70, 72 or 75, 77 formed in the flange 60, 65 on opposite sides of the center cut 15. In some embodiments the center portion 15 further comprises a first radiused strut 87 formed on a first side of the center cut 15 and a second radius strut 88 formed on the second side of the center cut 15. In some embodiments the a first gusset 95 and a second gusset 100 are formed between the center portion 15 and the first end 25. In some embodiments a first gusset 105 and a second gusset 110 is formed between the center portion 15 and the second end 30.

Some embodiments comprise a center portion allows for extreme strength of design by creating four deep vertical side walls instead of the usual two found in most gutter hangers. In some embodiments the horizontal flanges attached to the inside section of the vertical walls adds strength and stability as well as a surface suitable for attaching accessories such as Christmas light hangers, heat tape clips.

Some embodiments comprise dimples in horizontal flanges allow the user to attach roof straps in a new way which allows the roof straps to move slightly due to the natural expansion and contraction of the metal while keeping them locked into the hanger so that the movement is not unlimited.

Some embodiments comprise a center cut out allows dirt and water to drain through the hanger vs pooling which might cause deterioration of the material over time. Some embodiments comprise a double radius struts with attached flange absorbs the torque of the gutter screw used in hanging the hanger without twisting. This keeps the hanger from transferring the sideways torque of the screw to the front lip of the gutter where it would cause an obvious and unsightly dimple on the front of the gutter.

In some embodiments edges and/or points have been radiused to eliminate pokes and scratches to applicator, tools & materials. In some embodiments structural 90 degree bends have two gussets to increase strength. In some embodiments wide front and back footprint increases contact with surface area to both the gutter lip and the fascia board increasing strength and stability of the hanger and that gutter portion overall.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A gutter hanger comprising:
   a strut comprising a center portion having a primary surface, a first end, a second end, a center cut in the center portion extending axially between the first end and the second end, a first outer edge, and a second outer edge running parallel to the first outer edge,
   wherein the center cut extends substantially a length of the center portion, and wherein the center cut has a first inner edge and a second inner edge running parallel to the first inner edge;
   wherein the center portion further comprises a first side wall formed of the first outer edge, a second side wall formed of the first inner edge, a third side wall formed of the second inner edge, and a fourth side wall formed of the second outer edge, wherein each side wall extends parallel axially along the center portion in a plane substantially orthogonal to the primary surface of the gutter hanger;
   wherein the second side wall and the third side wall are radiused such that the second side wall and the third side wall join together at a first radiused distal end forming a first semi-circular junction and at a second radiused distal end forming a second semi-circular junction;

wherein the center cut further comprises a first flange extending orthogonally from the first inner edge towards a midline of the center cut and a second flange extending orthogonally from the second inner edge towards the midline of the center cut, wherein the gutter hanger further comprises a roof strap comprising a first end and a second end, the first end having a first notch configured to bidirectionally engage the first flange and a second notch configured to bidirectionally engage the second flange; and wherein the flanges further comprise a plurality of dimples.

2. The gutter hanger of claim 1, wherein the first flange and the second flange are each offset from the first radiused distal end and the second radiused distal end.

3. The gutter hanger of claim 1 wherein the center cut comprises a drain.

4. The gutter hanger of claim 1 wherein the center portion further comprises a first radius strut formed on a first side of the center cut and a second radius strut formed on a second side of the center cut.

5. The gutter hanger of claim 1, wherein the first outer edge and the second outer edge are each radiused near the first end and the second end.

6. The gutter hanger of claim 1 further comprising a first gusset and a second gusset formed between the center portion and the first end.

7. The gutter hanger of claim 1 further comprising a first gusset and a second gusset formed between the center portion and the second end.

8. A gutter hanger comprising:
a strut comprising a center portion, a first end, a second end, and a center cut in the center portion, the center cut comprising a radiused first distal end forming a first semi-circular junction and a radiused second distal end forming a second semi-circular junction between the first end and the second end, wherein the center cut extends substantially a length of the center portion, wherein the center portion further comprises:
a first radius strut formed on a first side of the center cut;
a second radius strut formed on a second side of the center cut;
a first flange extending orthogonally from a first inner edge of the center cut towards a midline of the center cut; and
a second flange extending orthogonally from a second inner edge of the center cut towards the midline of the center cut, wherein the first flange and the second flange each comprise a plurality of dimples; and
a roof strap comprising a first end and a second end, the first end having a first notch configured to bidirectionally engage the first flange and a second notch configured to bidirectionally engage the second flange.

9. The gutter hanger of claim 8 wherein the center portion further comprises a first side wall, a second side wall, a third side wall and a fourth side wall wherein each side wall extends parallel axially along the center portion in a plane substantially orthogonal to a surface of the gutter hanger.

10. The gutter hanger of claim 8 wherein the center cut comprises a drain.

11. A gutter hanger comprising:
a strut forming a primary plane, the strut comprising a center portion comprising a radiused first distal end forming a first semi-circular junction and a radiused second distal end forming a second semi-circular junction, a first end, a second end and a center cut in the center portion between the first end and the second end;
a first outer side wall formed of a first outer edge of the strut;
a second outer side wall formed of a second outer edge of the strut; and
an elongated reinforcement member extending transverse to the primary plane, the elongated reinforcement member comprising:
a first inner side wall extending from a first inner edge of the strut forming the center cut;
a second inner side wall extending from a second inner edge of the strut forming the center cut,
wherein the first inner sidewall is parallel with the second inner sidewall;
a third inner side wall extending from the first semi-circular junction; a fourth inner side wall extending from and the second semi-circular junction;
a first flange extending medially from a terminal end of the first inner side wall and parallel to the primary plane of the strut; a second flange extending medially from a terminal end of the second inner side wall and parallel to the primary plane of the strut; and
a plurality of corresponding dimples formed in each flange on opposite sides of the center cut,
wherein the first inner side wall forms a first side of the center cut, the second inner side wall forms a second side of the center cut, the third inner side wall forms a first end of the center cut, and the fourth inner side wall forms a second end of the center cut, wherein
the center cut consists of the first inner side wall, the second inner side wall, the third inner side wall, and the fourth inner side wall, wherein the center cut uniformly extends a distance transverse to the primary plane, wherein the first end of the center cut and the second end of the center cut are each radiused to form a correspond with the first semi-circular junction and the second semi-circular junction, respectively, and wherein
a length of the elongated reinforcement member extending from the first end of the center cut to the second end of the center cut is less than a length of the first outer side wall and is less than a length of the second outer side wall.

12. The gutter hanger of claim 11 wherein the center portion further comprises a first radius strut formed on a first side of the center cut and a second radius strut formed on the second side of the center cut.

13. The gutter hanger of claim 11 further comprising a first gusset and a second gusset formed between the center portion and the first end.

14. The gutter hanger of claim 11 further comprising a first gusset and a second gusset formed between the center portion and the second end.

* * * * *